United States Patent [19]
Wrzesinski

[11] 3,853,728
[45] Dec. 10, 1974

CERT OF CORR
ON LAST PAGE

[54] PHOTOCURABLE POLISHING WAX CONTAINING A POLYENE-POLYTHIOL RESIN

[75] Inventor: Joseph Francis Wrzesinski, Baltimore, Md.

[73] Assignee: W. R. Grace & Co., New York, N.Y.

[22] Filed: Sept. 27, 1973

[21] Appl. No.: 401,312

Related U.S. Application Data

[63] Continuation-in-part of Ser. No. 316,766, Dec. 20, 1972, abandoned, which is a continuation-in-part of Ser. No. 276,300, July 31, 1972, abandoned.

[52] U.S. Cl....... 204/159.18, 96/115 P, 117/93.31, 204/159.15, 204/159.14, 204/159.23, 204/159.24, 260/28, 260/28.5 R, 260/29.1 B, 260/29.7 SQ, 260/29.7 H, 260/42.29, 260/77.5 AP, 260/77.5 R, 260/79, 260/79.5 CN
[51] Int. Cl............................. C08d 1/00, C08f 1/00
[58] Field of Search..... 204/159.14, 159.18, 159.15, 204/159.23, 159.24; 260/28 R, 28.5 R, 29.7, 29.2

[56] References Cited
UNITED STATES PATENTS

| | | | |
|---|---|---|---|
| 3,328,325 | 6/1967 | Zdanowski | 260/22 |
| 3,661,744 | 5/1972 | Kehr et al. | 204/159.14 |

*Primary Examiner*—Paul Lieberman
*Assistant Examiner*—Richard B. Turer
*Attorney, Agent, or Firm*—Elton Fisher; Kenneth E. Prince

[57] ABSTRACT

A photocurable polishing wax having the following composition; (a) 1 part of a polyene having at least two unsaturated carbon to carbon bonds per molecule; (b) about 0.2–1 part of a nonionic emulsifier; (c) about 0.1–0.9 part of carnauba wax, paraffin wax, or a mixture thereof; (d) about 1–50 parts water; (e) a quantity of a liquid polythiol component having at least 2 thiol groups per molecule to provide about 0.6–1.1 equivalents of polythiol per equivalent of the polyfunctional component, the total functionality of the polyene and the polythiol being greater than 4; and (f) about 0.05–0.25 part of a photocuring rate accelerator.

14 Claims, No Drawings

PHOTOCURABLE POLISHING WAX CONTAINING A POLYENE-POLYTHIOL RESIN

CROSS REFERENCE TO RELATED APPLICATIONS

This is a continuation-in-part of application Ser. No. 316,766 filed Dec. 20, 1972 and now abandoned which was, in turn, a continuation-in-part of application Ser. No. 276,300 filed July 31, 1972 and now abandoned.

BACKGROUND OF THE INVENTION

This invention is in the field of polishing wax. More particularly it is in the field of photocurable polishing wax useful for protecting metal and other surfaces.

Wax compositions for polishing and protecting surfaces are well known to those skilled in the art.

The wax of this invention differs from those of the prior art in that it is a photocurable polishing wax comprising an aqueous dispersion having therein a polyfunctional component (a polyene) containing at least two reactive ethylenically unsaturated carbon-to-carbon bonds per molecule and a polythiol having molecules containing at least two thiol groups per molecule, the total functionality of the polyfunctional component and the polythiol being greater than 4, the polyfunctional component and the polythiol reacting in the presence of actinic light to produce a strong hard solid which adheres strongly to the surface on which the wax was applied. Sunlight provides ample actinic radiation to produce a cure (i.e., to cause the polyfunctional component and the polythiol to react to form the aforesaid hard solid which adheres strongly to the surface to which the wax composition was applied as a thin coating or film having a thickness of about 0.01–0.5 mil) within about 1–30 minutes.

U.S. Pat. No. 3,328,325 (Zdanowski, 260/22) teaches a polishing wax comprising a polymer. However, the wax of Zdanowski differs from the wax of this invention in that Zdanowski's wax contains a polymer per se while the wax of this invention contains precursors (the polyene and the polythiol) which react where exposed to actinic light (after the wax has been applied to a surface to be protected) to form a polymer which adheres to said surface.

SUMMARY OF THE INVENTION

In summary, this invention is directed to a photocurable polishing wax consisting essentially of:
a. 1 part of a polyene having the formula R$+$CH$_2$—CH=CH$_2)_n$;

R$+$O-CH$_2$—CH=CH$_2)_n$;

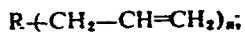

or

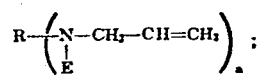

in which
 i. R is a hydrocarbyl radical having about 12–100 (preferably about 12–60) Carbon atoms.
 ii. E is hydrogen or —CH$_2$—CH=CH$_2$; and
 iii. n is an integer from 2 to 9.

b. about 0.2–1 part of a nonionic emulsifier;
c. about 0.1–0.9 parts (preferable about 0.2–0.5 parts) of a wax selected from the group consisting of carnauba wax, a paraffin wax melting at about 43°–68°C., or a mixture thereof;
d. about 1–50 parts of water;
e. a quantity of a liquid polythiol having the formula

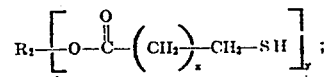

or

R$_2$$+$O$+$CH$_2)_x$CH$_2$—SH]$_y$ in which;
 i. R$_2$ is a hydrocarbyl radical having about 6–50 (preferably 6–30) carbon atoms;
 ii. x is an integer from 0 to 9; and
 iii. y is an integer from 2 to 5 to provide about 0.6–1.1 (preferable about 0.8–1.1 or 0.8–0.95) equivalents of polythiol per equivalent of the polyene, the total functionality of the polyene and the polythiol being greater than 4; and
f. 0.05–0.25 (preferable 0.05–0.1, or 0.05–0.2 or 0.06–0.1) part of a photocuring rate accelerator.

In addition to the above-listed components the photocuring polishing wax of this invention can contain additives such as; (a) beeswax (e.g., about 0.1–5 parts per part of said polyfunctional component); (b) glycerol or a glycol such as ethylene glycol, propylene glycol, diethylene glycol, dipropylene glycol, or the like – preferably about 0.1–3 parts per part of said polyfunctional component; (c) a silicone oil or silicone fluid (e.g., about 0.1–1 part of a silicone oil having a viscosity of about 4–1500 (preferably 20–1000 or 90–200) centipoises at 25°C per part of said polyfunctional component); and (d) a paraffin oil (e.g., about 0.1–3 parts of a paraffin oil having a viscosity of about 500–1000 centipoises at 20°C and a specific gravity of about 0.83–0.9 at 20°C per part of said polyfunctional component).

DESCRIPTION OF THE PREFERRED EMBODIMENTS

In preferred embodiments of the photocurable polishing wax of the above Summary:
1. The photocurable polishing wax contains about 5–25 percent (more preferably about 10–15 percent) by weight of a water insoluble, abrasive, particulate filler based on the weight of the photocurable polishing wax plus filler. Especially preferred fillers include particulate calcium oxide, magnesium oxide, calcined dolomite; calcium hydroxide, hydrated magnesium oxide, hydrated calcined dolomite, CaCO$_3$, clay, talc, mica, silica, alumina, titania, gypsum, glass, and the like, the particles being of such size that they will pass about a 100 mesh screen (or a 200 mesh screen or a 325 mesh screen). Because of my disclosure, other fillers will be readily apparent too those skilled in the art.
2. The photocuring rate accelerator is selected from the group consisting of an aryl aldehyde, a diaryl ketone, an alkyl aryl ketone, a triaryl phosphine, a dialkyl ketone, and a blend of a carbon tetrahalide with a polynuclear aromatic hydrocarbon.
3. The wax is carnauba wax.
4. The wax is paraffin wax.

5. The wax is a mixture of carnauba wax and paraffin wax (more preferably about equal parts of each by weight).
6. The photocuring rate accelerator is benzophenone.
7. The polyene is

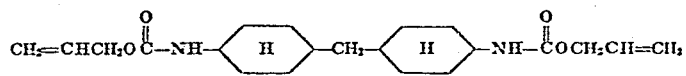

(which can be formed by the reaction of a mole 4,4'-dicyclohexylmethane diisocyanate

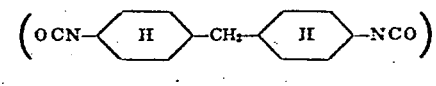

with two moles of allyl alcohol—both of which are articles of commerce)
8. The polythiol is pentaerythritol tetrakis(β-mercaptopropionate).
9. The nonionic emulsifier is polyoxypropylenepolyoxyethylene emulsifier (which can be prepared by the reaction of ethylene oxide with a polypropylene glycol), e.g., Pluronic F88.
10. The polyene is

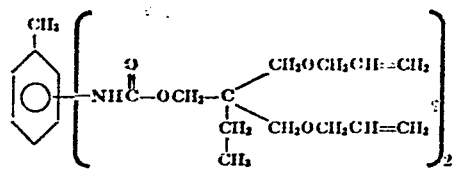

(which can be made by the reaction of a mole of toluene diisocyanate with 2 moles of the diallyl ether of trimethylol propane—both toluene diisocyanate and said diallyl ether being articles of commerce).

In another preferred embodiment ("Embodiment A") this invention is directed to a photocurable composition (a polishing wax) consisting essentially of:
a. 1 part of a polyene having the formula

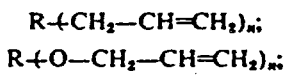
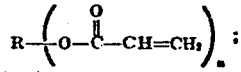
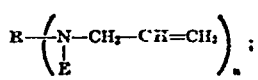

or $$R \!-\! \left( N\!-\!CH_2\!-\!CH\!=\!CH_2 \right)_n ;$$
$$\phantom{R \!-\! (}E$$

in which
i. R is a hydrocarbyl radical having about 12–100 (preferably 12–60) carbon atoms;
ii. E is hydrogen or —CH$_2$—CH=CH$_2$; and
iii. n is an integer from 2 to 9;
b. about 0.2–2 parts of a nonionic emulsifier;
c. about 0.1–0.9 parts of a wax selected from the group consisting of carnauba wax, a paraffin wax melting at about 43–68°C., or a mixture thereof;
d. about 0.1–0.9 parts of beeswax;
e. about 0.1–1 part of a silicone oil having a viscosity of 4–1,500 centipoises at 25°C.;
f. about 1–50 parts of water;
g. a quantity of a liquid polythiol having the formula

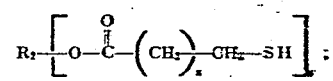

or

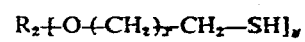

in which;
i. R$_2$ is a hydrocarbyl radical having about 6-50 (preferable 6-30) carbon atoms;
ii. x is an integer from 0 to 9; and
iii. y is an integer from 2 to 5 to provide about 0.6–1.1 equivalents of polythiol per equivalent of the polyene, the total functionality of the polyene and the polythiol being greater than 4; and
(h) 0.05–0.25 part of a photocuring rate accelerator.

Silicone fluids or oils are well known to those skilled in the art. They are described on pages 237–241 of Volume 18 of the Kirk-Othmer Encyclopedia of Chemical Technology, John Wily & Sons, Inc., New York, N. S. (1969) and on page 612 of the Seventh Edition of Smith's College Chemistry, Appleton-Century-Crofts, Inc., (1960).

In an especially preferred embodiment the photocurable composition of Embodiment A, supra, consists essentially of:
a. 1 part of a polyene having the formula

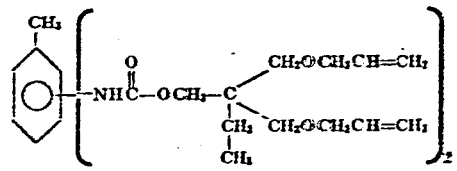

b. 1 part of Pluronic F88 a nonionic emulsifier prepared by the reaction of ethylene oxide with polypropylene glycol.
c. 0.5 part of carnauba wax;
d. 0.3 part of beeswax;
e. 0.5 part of a silicone oil having a viscosity of 90–200 centipoises at 25°C;
f. 3.5–4 parts of water;
g. 0.6 part of pentaerythritol tetrakis (β-mercaptopropionate); and
h. 0.08–0.12 part of benzophenone.

DETAILED DESCRIPTION OF THE INVENTION

It is an object of this invention to provide a composition of matter useful as a photocurable polishing wax excellently adapted to improve the appearance of and to protect metal surfaces, painted surfaces (including painted metal surfaces), and other surfaces (including wooden surfaces).

It is another object of this invention to provide a photocurable composition useful as a polishing wax which is excellently adapted to improve the appearance of and to protect surfaces and which can be readily cured by exposure to sunlight for about 1–30 or 5–25 minutes or by exposure to actinic radiation having a wavelength of about 3000–4000 A.

Still other objects will be readily apparent to those skilled in the art.

These and other objects have been attained by: (1) basing the photocurable polishing wax on a photocurable composition ("Composition A") consisting essentially of; (a) 1 part of a polyfunctional component (a polyene) containing at least two reactive ethylenically unsaturated carbon-to-carbon bonds per molecule; (b) a quantity of a liquid polythiol component having molecules containing at least two thiol groups per molecule to provide about 0.6–1.1 equivalent of polythiol per equivalent of the polyene (polyfunctional compound), the total functionality of the polyfunctional compound and the polythiol being greater than 4, and (c) 0.05–0.25 part of a photocuring rate accelerator; and (2) incorporating other essential and optional ingredients of the polishing wax of my invention into such composition A.

The following U.S. Patents teaching polyfunctional components (polyenes) containing at least two reactive unsaturated carbon-to-carbon bonds per molecule, polythiol components containing at least two thiol groups per molecule, photocuring rate accelerators and photocuring compositions comprising (or consisting essentially) of admixtures of such photocuring rate accelerators are incorporated herein by reference;

1. U.S. Pat. No. 3,615,450, Werber et al, 96/35.1.
2. U.S. Pat. No. 3,645,730, Frank et al, 96/28.
3. U.S. Pat. No. 3,537,853, Wessells et al, 96/35.1.
4. U.S. Pat. No. 3,535,193, Prince, 161/88.
5. U.S. Pat. No. 3,661,744, Kehr et al, 204/159.14.
6. U.S. Pat. No. 3,578,614, Wszolek, 260/13.
7. U.S. Pat. No. 3,660,088, Lundsager, 96/36.
8. U.S. Pat. No. 3,662,022, Lard, 260/837 R.
9. U.S. Pat. No. 3,662,023, Kehr et al, 260/858.
10. U.S. Pat. No. 3,700,574, Kehr et al, 204/159.14.

As used herein the term "reactive," as applied to an ethylenically unsaturated carbon-to-carbon bond, means that the ethylenically unsaturated bond will react under proper conditions as set forth herein with thiol groups to yield thioether linkage

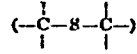

as contrasted to the term "unreactive" carbon-to-carbon unsaturation (i.e., an unreactive carbon-to-carbon double bond) which means

groups when found in aromatic nucleii (cyclic structures exemplified by benzene, pyridine, anthracene, tropolone and the like) which does not under the same conditions react with thiols to give a thioether linkage.

It is readily apparent that the hydrocarbyl radical (hydrocarbyl moiety), R, of the polyene used in preparing the composition of this invention is free of peroxide moieties, thiol moities, organometallic moieties, positive halogen moieties, and reactive unsaturated carbon-to-carbon bonds—except the reactive unsaturated carbon-to-carbon bonds present in the pendent groups:

$$-CH_2-CH=CH_2;$$

$$-O-CH_2-CH=CH_2;$$

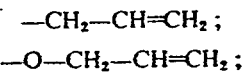

or

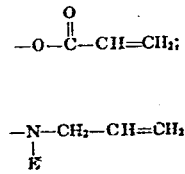

in which E is defined in the above Summary.

It is also readily apparent that said hydrocarbyl moiety (R) can contain cyclic groupings and heter. atoms such as N, S, P or O and that it should generally contain primarily carbon-carbon, carbon-nitrogen, or carbon-oxygen chain linkages.

It is further readily apparent that the hydrocarbyl moiety (hydrocarbyl radical), $R_2$, of the polythiol used in preparing the composition of this invention is free of peroxide moieties, positive halogen moieties, organiometallic moieties, reactive unsaturated carbon-to-carbon bonds, and thiol moieties-except the thiol moieties present in the pendent groups:

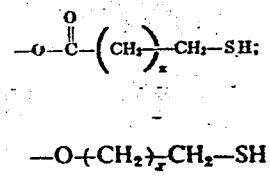

or $$-O+(CH_2)_x-CH_2-SH$$

in which x is defined in the above Summary.

It is also readily apparent that said hydrocarbyl radical ($R_2$) can contain cyclic groupings and minor amounts or hetero atoms such as N, S, P or O but primarily contains carbon-carbon, carbon-nitrogen, or carbon-oxygen chain linkages.

Nonionic emulsifiers are well known to those skilled in the art. A large number of such emulsifiers, which can be used with excellent results in preparing the photocurable polishing wax of this invention, are described on pages 127–131 of Volume 8 of the Second Edition of the Kirk-Othmer "Encyclopedia of Chemical Technology" (1969). The Pluronic surfactants (condensation products of ethylene oxide and polypropylene glycol), especially Pluronic F-88, are preferred emulsifiers for use in preparing the photocurable polishing wax of this invention.

Where preparing a photocurable polishing wax of the instant invention I have usually followed a procedure comprising:

1. Forming a first mixture by admixing 1 part of the aforesaid polyfunctional component (polyene) containing at least two reactive unsaturated carbon-to-carbon bonds per molecule with about 0.25–0.5 part of a nonionic emulsifier.
2. Adjusting the temperature of the first mixture to about 80–90°C. (if it is not already within this temperature range); vigorously agitating (e.g., stirring at a rapid rate) the first mixture and adding hot (ca. 80°–90°C.) water thereto while vigorously agitating the resulting second mixture and maintaining it at about 80–90°C. The water is added in increments of about 0.1 to 0.3 part per part of the polyfunctional component until a total of about 1–50 parts of water per part of the polyfunctional component has been added over a period of about 0.5–2 hours.

3. Maintaining the second mixture at about 80–90°C. and continuing to agitate it vigorously and adding about 0.1–0.6 parts of wax (carnauba wax, paraffin wax, or a mixture thereof) per part of the polyfunctional component (polyene) thereto while vigorously agitating the resulting third mixture and maintaining it at ca. 80–90°C. I prefer to add the wax in the molten state or as small (ca. minus about 4 mesh) chips or as powder (ca. minus about 8 mesh) but larger particles of wax can be added.

a. Where including beeswax in the composition I prefer to admix it (the beeswax) with the other wax (carnauba wax, paraffin wax, or a mixture thereof) and add the resulting mixed wax to the second mixture prepared in step 2, supra.

b. Where including paraffin oil and/or silicone oil (silicone fluid) in the polishing wax of this invention I can admix the paraffin oil and/or silicone oil with the wax and add the resulting mixture of oil and wax to the second mixture prepared in step 2, supra. However, the oil per se can be admixed the third mixture before adding the polythiol thereto, or to the fourth mixture, infra, or to the fifth mixture, infra.

c. Where including glycerol (or a glycol) in the polishing wax of this invention the glycerol can be added to the third mixture. Alternatively, the glycerol can be admixed with the water before adding the water to the first mixture.

4. Maintaining the third mixture at about 80–90°C. and agitating it vigorously while adding the aforesaid polythiol thereto in an amount to provide, in the resulting fourth mixture about 0.6–1.1 equivalents of thiol per equivalent of polyfunctional compound, and continuing to agitate the resulting fourth mixture vigorously while maintaining said fourth mixture at about 80–90°C.

5. Maintaining the fourth mixture at about 80–90°C. and agitating it vigorously while adding thereto about 0.05–0.25 part of the photocuring rate accelerator (said rate accelerator being added in the liquid or molten state) per part of the polyfunctional component while vigorously agitating the resulting fifth mixture and maintaining it at about 80–90°C.

6. Cooling the fifth mixture (the photocurable polishing wax of my invention) to about 20–20°C. (preferably over a period of about 0.5–2 hours) while continuing to agitate it.

While the above procedure is the preferred method for preparing my photocurable polishing wax composition it is not the only procedure by which said composition can be prepared. For example: (a) the photocuring rate accelerator can be added as a fine powder (e.g., minus ca. 200 mesh or finer) or it can be dispersed in the water and added with the water; (b) the polythiol can be admixed with the system before or after adding the water; (c) if the polyfunctional compound and the polythiol are admixed before the water is added the polythiol can be admixed into the system before or after the emulsifier is admixed into the system; (d) the emulsifier must be present in the system when the water is added thereto; and (e) the wax can be added before or after adding the polythiol.

Various other modifications will, because of my disclosure, be readily apparent to those skilled in the art. I have found that it is important that the water be added to a mixture comprising at least the polyfunctional compound and the emulsifier rather than: (a) adding the polyfunctional compound and the emulsifier to the water; or (b) adding the polyfunctional compound to a mixture comprising the water and the emulsifier. I have also found that it is important that the mixture to which the water is added should contain the emulsifier and be agitated vigorously while adding the water thereto.

One skilled in the art can readily determine the degree of agitation which is sufficiently vigorous for this purpose because the desired emulsion will not form if agitation is not sufficiently vigorous. It is also important that the water be added in relatively small increments (ca. 0.1–0.3 or 0.4 part per part of the polyfunctional component) because if too much water is added at one time (or if the increments are added too close together) the desired emulsion will not form. Because of my disclosure one skilled in the art can readily determine the proper increment size and the proper period of time between increments. Alternatively, the second mixture can be formed by slowly adding the water as a small continuously flowing stream.

If desired, about 5–25 percent of a water insoluble, abrasive, particulate filler (based on the weight of photocurable polishing wax plus said filler) can be incorporated into the photocurable polishing wax at any step during the preparation of said wax.

Because of my disclosure, it will be readily apparent to those skilled in the art that, after incorporating the photocuring rate accelerator and the polythiol therein the composition must be protected from exposure to sunlight or other actinic radiation because, once the polyfunctional component, the polythiol, and the photocuring rate accelerator are all present in the composition, the composition will cure (polymerize) on exposure to actinic radiation.

Among the polyenes which have been used to prepare the photocurable polishing wax of this invention are:

1. A triene (designated "T-1") which has the formula

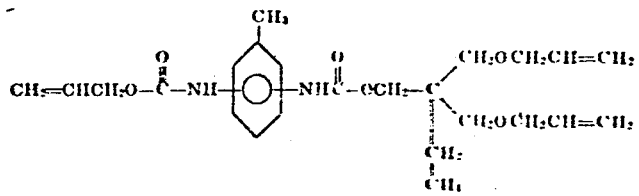

was prepared by admixing and reacting equal molar quantities (e.g., 1 mole of each) of toluene diisocyanate, trimethylol propane diallyl ether, and allyl alcohol. About 0.1 g of dibutyl tin dilaurate was present to catalyze the reaction. Said triene (T-1) produced photocurable polishing wax of excellent quality.

2. o-, m-, and p-diallyl phthalate (all designated "T-2") and mixtures of any two (and all three) of these isomeric phthalates were used to prepare the polishing wax of my invention. In each instance the photocurable polishing wax was a polishing wax of excellent quality.

3. A tetraene (designated "T-3") which has the formula

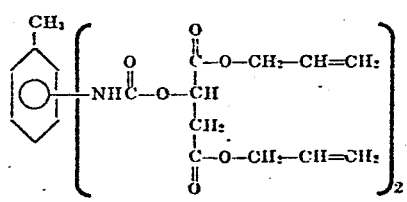

was prepared by; (a) esterifying malic acid with allyl alcohol to form diallyl malate; and (b) reacting 2 moles of the diallyl malate with one mole of toluene diisocyanate. About 0.2 g of dibutyl tin dilaurate can be used as catalyst where using 1 mole of toluene diisocyanate. Said tetraene (Y-3) was used to prepare the photocurable polishing wax of this invention. The resulting wax was a polishing wax of excellent quality.

4. A diene (designated "T-4") which has the formula

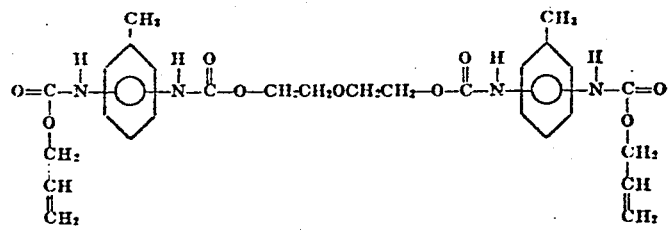

was prepared by admixing and reacting 2 moles of toluene diisocyanate, 1 mole of diethylene glycol and 2 moles of allyl alcohol. About 0.4 g of dibutyl tin dilaurate can be added as catalyst. Said diene (T-4) was used to prepare the photocurable polishing wax of my invention. The thus prepared wax was an excellent polishing wax.

5. Other dienes (designated "T-5") and having the formula

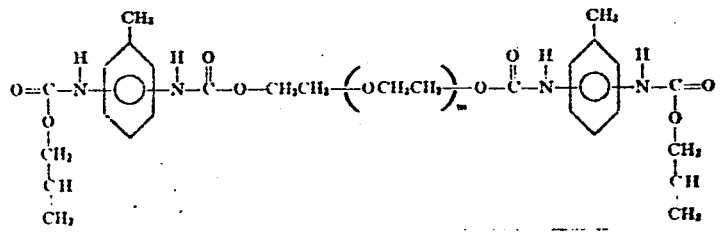

were prepared according to the general procedure used to prepare the diene designated T-4; however, where preparing a diene to be designated T-5, the diethylene glycol used to prepare T-4 was replaced (on a mole for mole basis) with a polyethylene glycol having the formula $$HO\text{-}(CH_2CH_2\text{-}OCH_2CH_2)_m\text{-}OH,$$

in which $m$ is an average number. Runs were made using polyethylene glycols in which $m$ was 2, 11, 19, and 37. Each diene (each diene designated T-5) made from a polyethylene glycol having one of said values for $m$ was used to prepare a photocurable polishing wax of this invention and each such wax was an excellent polishing wax for polishing metal surfaces including automobile bodies.

6. A tetraene (designated "T-6") was prepared by; (a) admixing and reacting 2 moles of 3-isocyanatomethyl-3,5,5-trimethylcyclohexylisocyanate (IPDI) and one mole of a polyethylene glycol having an average molecular weight of about 400 to form one mole of intermediate compound having two isocyanate groups per molecule; and (b) admixing and reacting 1 mole of said intermediate and two moles of trimethylol propane diallyl ether to form the tetraene designated T-6. If desired about 0.4 g of dibutyl tin dilaurate can be added to catalyze the reaction between the isocyanate radicals and the hydroxyl groups of; (a) the polyethylene glycol; and (b) the trimethylol propane diallyl ether. This tetraene was used to prepare the photocurable polishing wax of the instant invention. The resulting wax was a polishing wax of excellent quality well adapted for polishing automobile bodies.

7. A tetraene (designated "T-7") was prepared by; (a) admixing and reacting 2 moles of toluene diisocyanate and one mole of di(2-hydroxyethyl)dimethylhydantoin (DHM) to form 1 mole of an intermediate compound having two isocyanate groups (radicals) per molecule; and (b) admixing and reacting 1 mole of said intermediate and two moles of trimethylol propane diallyl ether to form the tetraene designate T-7. If desired, about 0.3-0.4 g of dibutyl tin dilaurate can be used to catalyze reaction of the isocyanate groups with the hydroxyl groups of the DHM and the trimethylol propane diallyl ether. This polyene (T-7) was found to be excellently adapted for preparing the photocurable polishing wax of this invention, and such wax prepared with T-7 was a wax of excellent quality well adapted for polishing automobile bodies and other metal surfaces.

8. A tetrane (designated "T-8") was prepared according to the general procedure used to prepare the tetraene which was designated T-7. However, in this instance, the procedure was modifying by replacing the 2 moles of toluene diisocyanate which was used to prepare polyene T-7 with 2 moles of the above described IPDI (which was used to prepare the tetraene designated T-6). The resulting tetraene (T-8) was excellently adapted for use in preparing the photocurable polishing wax of my invention, and wax prepared with tetraene T-8 was of excellent quality, being well adapted for polishing automobile bodies and other metal surfaces.

9. A triene (designated "T-9") was prepared by admixing 272 g of pentaerythritol and 1300 g of a 50% sodium hydroxide solution and adding thereto 1936 g of allyl bromide while maintaining the resulting mixture at 70°–80°C for about 12 hours. The product (T-9) was identified as the triallyl ester of pentaerythritol. It was used to prepare the photocuring polishing wax of my invention and said wax was found to be excellently adapted for polishing automobile bodies.

Among the polythiols which have been used to prepare the photocurable polishing wax of this invention are:

1. Trimethylol propane tris (3-mercaptopropionate) which is designated "P-1".
2. Trimethylol propane tris (2-mercaptoacetate) which is designated "P-2".
3. Pentaerythritol tetrakis (β-mercaptopropionate) which is designated "P-3".
4. Pentaerythritol tetrakis (α-mercaptoacetate) was designated "P-4".
5. Tris(2-hydroxyethyl)isocyanurate tris(3-mercaptopropionate) was designated "P-5"; it was made by the procedure taught by U.S. Pat. No. 3,676,440 (Los, 260/248).
6. Tris(2-hydroxyethyl)isocyanurate tris(2-mercaptoacetate) which was designated "P-6" was prepared by the general procedure used to prepare P-5, but said procedure was modified by replacing the 3-mercaptopropionic acid with 2-mercaptoacetic acid.
7. A polythiol ("p-7") was prepared by; (a) esterifying one of the OH groups of dipentaerythritol (DPE) with stearic acid (or with the acid chloride of stearic acid) to form an intermediate; and (b) then esterifying the remaining 5 OH groups of the intermediate with 3-mercaptopropionic to form polythiol P7.
8. A polythiol ("P-8") was prepared by; (a) esterifying two of the OH groups of DPE with stearic acid (or the acid chloride thereof) according to the general procedure used to prepare T-7 but modifying said procedure by using with two moles of stearic acid (or its acid chloride) per mole of DPE; and (b) then esterifying the remaining 4 OH groups with 3-mercaptopropionic acid to form polythiol P-8.
9. A polythiol ("P-9") was prepared by the method used to prepare P-8 except that 3 moles of stearic acid (or its acid chloride) and 3 moles of 3-mercaptopropionic acid were used per mole of DPE.
10. A polythiol (designated "P-10") was prepared by the method used to prepare P-8 except that 4 moles of stearic acid (or its acid chloride) and 2 moles of 3-mercaptopropionic acid were used per mole of DPE.

11. A polythiol (designated "P-11") was prepared by the process used to prepare P-7 but modified by replacing the 3-mercaptopropionic acid with 2-mercaptoacetic acid.

12-14. Polythiols (designated "P-12", and "P-13" "P-14") were prepared by the general method used to prepare P-11 except that to prepare; (a) p-12, 2 moles of stearic acid (or its acid chloride) were use; (b) P-13, 3 moles of stearic acid (or its acid chloride) were used; and (c) P-14, 4 moles of stearic acid (or its acid chloride) were used.

15. A polythiol (designated "P-15") was prepared by reacting (esterifying) all 6 OH groups of DPE with 3-mercaptopropionic acid.
16. A polythiol (designated "P-16") was prepared by reacting (esterifying) all 6 OH groups 2-mercaptoacetic acid.
17. A polythiol (designated "P-17") was prepared by reacting bisphenol A with propylene oxide (2 moles of said oxide per mole of bisphenol A) and esterifying the resulting glycol with 3-mercaptopropionic acid.
18. A polythiol (designated "P-18") was prepared by the procedure used to prepare P-17 except that the 3-mercaptopropionic acid was replaced with 2-mercaptoacetic acid.
19. A polythiol (designated "P-19") was prepared by reacting the above-described T-9 with a stoichiometric amount of thiolacetic acid (3 moles of said acid per mole of T-9) in the presence of a catalytic amount of t-butyl hydroperoxide. Reaction temperature was about 80°–90°C. The reaction product was admixed with aqueous sodium hydroxide (using 2.5 equivalents of said hydroxide for each equivalent of T-9 feed), refluxed for about 3 hours, cooled and extracted with ether. The product which was recovered from the ether was identified as

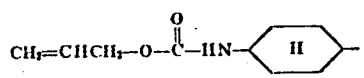

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE I

A diene having the formula

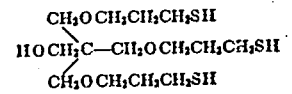

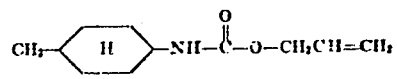

was prepared by reacting allyl alcohol with a stoichiometric quantity of 4,4'-dicyclohexylmethane diisocyanate (2 moles of the alcohol per mole of the diisocyanate) in the presence of 0.2 g of dibutyl tin dilaurate catalyst in a resin kettle while maintaining the reacting mass under an atmosphere of nitrogen. The resulting diene (which was a solid melting at 93°C.) was designated ("Product 1").

EXAMPLE 2

A tetraene designated "Product 2" was prepared by the following method:

Five moles of Epon 828 (a epoxy compound (obtained from Shell Chemical Co.) having the formula

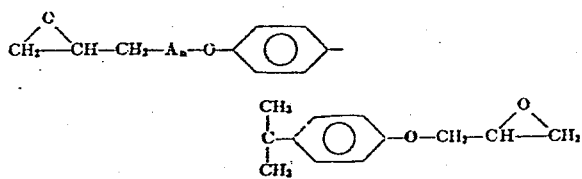

in which A is

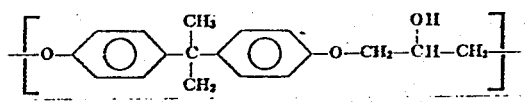

and $n$ is a number greater than 0 and less than 1 and having an average value such that the average molecular weight of the epoxy compound is about 390) and twelve moles of diallylamine were admixed under an atmosphere of nitrogen and maintained at about 80°-90°C. (under said atmosphere of nitrogen) for about 2–3 hours. Then unreacted diallyl amine was distilled off under reduced pressure (ca. 1–10 mm of mercury absolute) and the residue (substantially-pure Product 2) was recovered.

EXAMPLE 3

A 100 g portion of Product 1 (the diene prepared in Example 1) was heated to about 90°C. and 50 g of Pluronic F88 (a nonionic emulsifier resulting from the action of ethylene oxide and polypropylene glycol) was added thereto to form a first mixture. The first mixture was stirred vigorously and 500 g of water having a temperature of about 90°C was added thereto in about 20 ml increments over a period of about an hour while vigorously stirring the first mixture and the resulting second mixture and while maintaining the temperature thereof about 90°C. A 50 g portion of a mixture of carnauba wax and paraffin wax (melting at about 55°-60°C.) was added to the second mixture while vigorously stirring the second mixture and the resulting third mixture and while maintaining the temperature thereof at about 90°C. The wax mixture (equal parts by weight of carnauba wax and paraffin wax) was added as a powder passing an eight mesh screen. A 64 q portion of pentaerythritol tetrakis ($\beta$-mercaptopropionate) was added to the third mixture while vigorously stirring the third mixture and the resulting fourth mixture and while maintaining the temperature thereof at about 90°C. An 8 g portion of molten benzophenone (a photocuring rate accelerator) was added to the fourth mixture while vigorously stirring the fourth mixture and the resulting fifth mixture (the photocurable wax of my invention) and while maintaining the temperature thereof at about 90°C. While stirring the fifth mixture it (the fifth mixture) was cooled from about 90°C. to about 25°C. over a period of about 2 hours. The thus formed wax (which was designated "Product 3") was packaged in a light proof container and the container was closed with a light proof closure.

A thin coating of the above described photocurable polishing wax (Product 3) was applied to the surface of an automobile body using a conventional waxing technique except that the wax was applied and rubbed into a smooth coating while the automobile was in a garage where it was protected from sunlight and other actinic radiation.

After applying the wax and rubbing it smooth the automobile was placed in direct sunlight. In about 10 minutes the wax coating hardened into hard, scratch resistant, transparent finish which on buffing became very smooth and glossy. When driving in bad weather (including snow and rain) this wax coating held up better and retained its appearance better than a coating of conventional automobile wax.

EXAMPLE 4

The general procedure used to prepare product 3 was repeated. However, in this instance the procedure was modified by heating the diene (Product 1) to 80°C. (rather than to 90°C.) and conducting the subsequent steps at 80°C. rather than at 90°C. The resulting photocurable polishing wax (which was designed "Product 4") when applied to an automobile and cured was indistinguishable from Product 3.

EXAMPLE 5

In another run the general procedure used to prepare Product 3 was repeated. However, in this instance the procedure was modified by adding 160 g of particulate calcium carbonate (which passed a 200 mesh screen) to the vigorously stirred third mixture before adding the polythiol thereto (the temperature of the third mixture being maintained at about 90°C. while adding the particulate calcium carbonate thereto). The resulting product (Product 5) was found to be a superior photocuring polishing wax when applied to an automobile body, cured in sunlight, and buffed after curing.

Excellent photocurable polishes, each of which gave excellent results where applied to an automobile body, cured, and buffed after curing, were also obtained in other runs in which the calcium carbonate was replaced with 160–400 g portions of various other particulate fillers (including those listed in the above Description of Preferred Embodiments) passing a 325 mesh screen.

EXAMPLE 6

The general procedure used to prepare Product 3 was repeated. However, in this instance the procedure was modified by replacing the diene (Product 1) used in Example 3 with the tetraene (Product 2) prepared in Example 2. In this instance 55 g of pentaerythritol tetrakis ($\beta$-mercaptopropionate) was used.

The resulting product (Product 6) was a photocurable polishing wax of high quality excellently adapted for use as a polishing wax for automobiles, metal surfaces and wooden surfaces.

EXAMPLE 7

The general procedure of Example 6 was repeated. However, in this instance the pentaerythritol tetrakis (β-mercaptopropionate) was replaced with 90 g of ethylene glycol (β-mercaptopropionate).

The resulting product (Product 7) was a photocurable polishing wax of high quality excellently adapted for use as a polishing wax for automobiles.

EXAMPLE 8

A tetraene having the formula

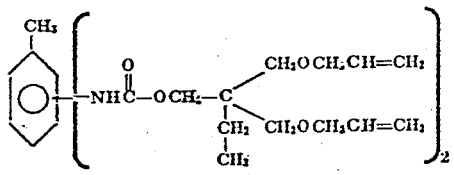

was prepared by admixing 2 moles of trimethylol propane diallyl ether and 0.2 g of dibutyl tin dilaurate as a catalyst in a resin kettle. The mixture was kept therein under nitrogen. The resin kettle was equipped with a stirrer, thermometer, dropping funnel, and a gas inlet and outlet. 1 mole of toluene diisocyanate was added slowly with stirring and the reaction temperature was maintained at 70°C. by means of a water bath. After addition of the toluene diisocyanate, the reaction continued for about 1 hour at 70°C. until the —NCO content was substnatially zero. The thus formed tetra-allyl, terminated liquid product was designated "Product 8".

EXAMPLE 9

A 100 g portion of Product 8 (the tetraene prepared in Example 8) was heated to about 90°C. and 100 g of Pluronic F88 (a nonionic emulsifier resulting from the action of ethylene oxide and polypropylene glycol) was added thereto to form a first mixture. The first mixture was stirred vigorously and 380 g of water having a temperature of about 90°C was added thereto in about 20 ml increments over a period of about an hour while vigorously stirring the first mixture and the resulting second mixture and while maintaining the temperature thereof about 90°C. A 50 g portion of a mixture of carnauba wax admixed with a 30 g portion of beeswax was added to the second mixture while vigorously stirring the second mixture and the resulting third mixture and while maintaining the temperature thereof at about 90°C. The wax mixture was added as a powder passing an eight mesh screen. A 60 g portion of pentaerythritol tetrakis (β-mercaptopropionate) was added to the third mixture while vigorously stirring the third mixture and the resulting fourth mixture and while maintaining the temperature thereof at about 90°C. An 11 g portion of molten benzophenone (a photocuring rate accelerator) was added to the fourth mixture while vigorously stirring the fourth mixture and the resulting fifth mixture and, while maintaining the temperature thereof at about 90°C, a 50 g portion of silicone oil (Dow Corning Silicone Fluid No. 550) was added to the fifth mixture while vigorously stirring the fith mixture and the resulting sixth mixture and while maintaining the temperature thereof at about 90°C. While stirring the sixth mixture it (the sixth mixture) was cooled from about 90°C to about 25°C over a period of about 2 hours. The sixth mixture, a photocurable waxy of my invention, was designated "Product 9". Said Product 9 packaged in a light proof container was closed with a light proof closure.

A thin coating of the above described photocurable polishing wax (Product 9) was applied to the surface of an automobile body using a conventional waxing technique except the the wax was applied and rubbed into a smooth coating while the automobile was in a garage where it was protected from sunlight and other actinic radiation.

After applying the wax and rubbing it smooth the automobile was placed in direct sunlight. In about 10 minutes the wax coating hardened into hard, scratch resistant, transparent finish which on buffing became very smooth and glossy. When driving in bad weather (including snow and rain) this wax coating held up better and retained its appearance better than a coating of conventional automobile wax.

EXAMPLE 10

The general procedure of Example 3 was repeated. However, in this instance the procedure was modified by replacing the diene (Product 1) used in Example 3 with the tetraene (Product 8) prepared in Example 8. In this instance 81 g of pentaerythritol tetrakis (β-mercaptopropionate) was used.

The resulting product (Product 10) was a photocurable polishing wax of high quality excellently adapted for use as a polishing wax for automobiles, metal surfaces, and wooden surfaces.

In other runs (Runs 1-7 reported below) using the general procedure of Example 3;

1. Product 1 (the polyfunctional component (polyene) containig at least two reactive ethylenically unsaturated carbon-to-carbon bonds per molecule) which was used in Example 3 was replaced with each of the polyfunctional components containing molecules having at least two reactive ethylenically unsaturated carbon-to-carbon bonds per molecule which are taught in the above-mentioned US Patents Nos:

a. U.S. Pat. No. 3,615,450, Werber et al, 96/35.1.
    b. U.S. Pat. No. 3,645,730, Frank et al, 96/28.
    c. U.S. Pat. No. 3,537,853, Wessells et al, 96/35.1.
    d. U.S. Pat. No. 3,535,193, Prince, 161/88.
    e. U.S. Pat. No. 3,661,744, Kehr et al, 204/159.14.
    f. U.S. Pat. No. 3,578,614, Wazolek, 260/13.
    g. U.S. Pat. No. 3,660,088, Lundsager, 961/36.
    h. U.S. Pat. No. 3,662,022, Lard, 260/837 R.
    i. U.S. Pat. No. 3,662,023, Kehr et al, 260/85b.
    j. U.S. Pat. No. 3,700,574, Kehr et al, 204/159.14.

In each instance care was used to match the polyfunctional component with a polythiol that would assure a total functionality (the functionality of the polyene and the polythiol) greater than 4.

2. The polythiol (pentaerythritol tetrakis (β-mercaptopropionate)) which was used in Example 3 was replaced with each of the polythiol components having molecules containing at least two thiol groups per molecule which are taught in said above-mentioned patents and by U.S. Pat. No. 3,676,440 (Los, 260/248NS) using care to match the polythiol with a polyfunctional compound (polyene) so that the total functionality of the resulting mixture was greater than 4.

3. The benzophenone (photocuring rate accelerator) used in Example 3 was replaced with the photocuring rate accelerators taught in said above-mentioned U.S. Patents using amounts of photocuring rate accelerator varying from about 0.05 to about 0.25 part or more (preferably 0.05-0.15 part) of photocuring rate accelerator per part of polyene.

4. The emulsifier used in Example 3 was replaced with the nonionic emulsifiers listed on pages 128-130 of volume 8 of the Second Edition (1965) of Othmer, "Encyclopedia of Chemical Technology." These runs were made using 0.2, 0.3, 0.6, 1 and 1.5 part of emulsifier per part of polyene.

5. The carnauba wax-paraffin wax mixture used in Example 3 was replaced with; (a) caranauba wax; (b) paraffin wax; and (c) mixtures of 0.1, 0.2, 0.5, 1, 5, 10, and 20 parts of paraffin wax per part of carnauba wax. These runs were made using 0.1, 0.3, 0.6, and 0.9 part of the wax per part of the polyene.

6. The quantity of water was varied using 1, 2, 3, 4, 5, 10, oxide, magnesium oxide, calcined dolomite, calcium hydroxide, hydrated 40, and 50 parts of water per part of the polyfunctional compound containing at least two ethylenically unsaturated bonds per molecule.

7. A large number of particulate water insoluble abrasive fillers including particulate dolomite, calcium phosphate, calcium hydroxide, hydrated magnesium oxide, hydrated calcined dolomite, clay, talc, mica, silica, alumina, titania, gypsum, glass, and the like, the particles being of such size that they passed about a 100 mesh screen (or a 200 mesh screen or a 325 mesh screen) were used in place of the calcium carbonate of Example 5. The quantity of filler used included 5, 10, 20, and 25 percent based on the weight of the photocuring polishing wax plus filler. Mixtures of these fillers were also used keeping the total amount of filler within the above-mentioned range (5-25 percent calculated on the above-named basis).

Each composition prepared in the above-mentioned runs (Runs 1-7) was a high quality photocurable polishing wax which was excellently adapted for polishing automobile bodies and other metal or wooden surfaces.

When preparing each composition (photocurable polishing wax) reported in said Runs 1-7; (a) the polyene and polythiol used were always selected so that the total functionality (that of the polyene plus that of the polythiol) was greater than 4; and (b) the equivalent ratio of polyene to polythiol was maintained within the range of 1:0.6-1.1.

EXAMPLE 11

Run No. 1: A photocurable wax was prepared according to the general procedure of Example 9. However, in this run the procedure was modified by using the following materials in the quantities set forth below:

100 g of the tetraene prepared in Example 8
100 g of Pluronic F8S (a nonionic emulsifier)
380 g of water
50 g of carnauba wax admixed with 41 g of bees wax and 82 g of silicone oil having a viscosity of 125 centistokes (specific gravity 1.07) at 25°C
60 g of pentaerythritol tetrakis ($\beta$-mercaptopropionate)
11 g of benzphenone The resulting photocurable wax was designated "Wax No. R1."

Run No. 2: A test strip (a painted steel strip) was coated with a film of Wax No. R1 (prepared in Run No. 1, supra) which was polished by rubbing with a clean soft cloth and then cured by exposure to sunlight for about 10 minutes. The thus polished and cured surface of the test strip had a bright glossy appearance. Water applied to the waxed surface as a spray formed beads which ran off (i.e., the water did not form an aqueous film on the waxed surface).

The polished and cured test strip was subjected to a weather sensitivity test using a commercially available Xenotest appliance (obtainable from Carl Zeiss, Inc., 444 Fifth Avenue, New York, N. Y. 10018). In this test the waxed surface was continuously exposed to actinic light having wave lengths corresponding to those of actinic sun light while being intermittently subjected to a water spray. The spray cycle was one-half hour on and one-half hour off.

After 170.3 hours testing the waxed surface still had a glossy appearance, and water applied to the waxed surface as a spray formed beads which ran off.

Run No. 3: A second test strip from the same lot as that used in Run No. 2, supra, was coated with a film of a first commercially available automobile polishing wax (J Wax) which was polished by rubbing with a clean soft cloth. The polished waxed surface had a bright glossy appearance, and water applied thereto as a spray formed beads which ran off.

The polished waxed surface was subjected to the above-described weather sensitivity test. After 169.5 hours testing the surface no longer appeared glossy. Water applied to the tested surface as a spray did not form beads; it coated the tested surface with a film of water.

Run No. 4: The general procedure of Run No. 3, supra, was repeated. However, in this instance the procedure was modified by replacing the first commercially available automobile polishing wax with a second commercially available automobile polishing wax (Simonize). The polished waxed surface had a bright glossy appearance, and water applied thereto as a spray formed beads which ran off.

The polished surface was subjected to the above-described weather sensitivity test. After 169.5 hours testing the surface had only a slight gloss, and water applied thereto as a spray did not form beads. On the contrary, the water spray coated the tested surface with a film of water.

EXAMPLE 12

A series of photocurable polishing waxes of my invention were made in a series of runs (reported in the following table) using the general procedure of Example 3. However, in the runs of this example said procedure was modified by using, in the respective run, the polyene listed (in said table) for such run and the polythiol listed (in said table) for such run. In each run the total functionality (that of the polyene plus that of the polythiol) was always greater than 4.

In each run a 100 g portion of polyene was used and the quantity of polythiol was so selected that the equivalent ratio of polyene to polythiol was 1:0.6–1.1.

The photocurable polishing wax made in each of said runs was used to polish a painted outside surface of an automobile body. The wax gave an excellent polish which remained in good condition during a 9 month test period — each of said automobiles being driven regularly (at least 200 miles per week in the Washington - Baltimore area.

PREPARATION OF PHOTOCURABLE POLISHING WAX

| Run No. | Polyene | Polythiol | Equivalent Ratio of Polyene:Polythiol |
|---|---|---|---|
| 1 | T-1 | P-1 | 1:1 |
| 2 | T-1 | P-2 | 1:0.8 |
| 3 | T-1 | P-3 | 1:0.7 |
| 4 (a) | T-2 (a) | P-4 | 1:0.6 |
| 5 (b) | T-2 (b) | P-5 | 1:1.1 |
| 6 (c) | T-2 (c) | P-5 | 1:0.95 |
| 7 | T-3 | P-6 | 1:0.65 |
| 8 | T-3 | P-10 | 1:0.85 |
| 9 | T-4 | P-6 | 1:1 |
| 10 (d,e) | T-5 (d,e) | P-7 | 1:1 |
| 11 | T-6 | P-7 | 1:1 |
| 12 | T-7 | P-8 | 1:0.7 |
| 13 | T-8 | P-8 | 1:0.7 |
| 14 | T-9 | P-8 | 1:0.75 |
| 15 (f) | T-2 (f) | P-11 | 1:0.6 |
| 16 | T-4 | P-9 | 1:0.65 |
| 17 | T-1 | P-10 | 1:0.6 |
| 18 | T-7 | P-12 | 1:1.1 |
| 19 | T-3 | P-13 | 1:1.05 |
| 20 | T-6 | P-14 | 1:0.8 |
| 21 (f) | T-2 (f) | P-15 | 1:0.7 |
| 22 | T-8 | P-16 | 1:0.9 |
| 23 | T-1 | P-17 | 1:1 |
| 24 | T-1 | P-18 | 1:0.95 |
| 25 | T-4 | P-19 | 1:0.85 |
| 26 | T-1 | P-9 | 1:0.75 |
| 27 | T-1 | P-10 | 1:0.65 |
| 28 (f) | T-2 (f) | P-12 | 1:0.6 |
| 29 | T-8 | P-19 | 1:0.7 |
| 30 | T-9 | P-19 | 1:0.8 |
| 31 (g) | T-2 (g) | P-3 | 1:1 |
| 32 (h) | T-2 (h) | P-15 | 1:1 |
| 33 (i) | T-2 (i) | P-16 | 1:1 |

(a) The polyene was o-diallyl phthalate.
(b) The polyene was p-diallyl phthalate.
(c) The polyene was m-diallyl phthalate.
(d) In this run (Run No. 10) m was 2. (See the description of polyene T-5, supra.)
(e) Run 10 was made using a polyene T-5 in which "m" was 2, then replications of this run were made in which the procedure was modified by using T-5 polyenes in which "m" was 2, 11, 19, and 37. In each instance the resulting photocuring polishing wax was a wax of excellent quality excellently adapted for polishing automobiles and other metal surfaces.
(f) The polyene was a mixture of o-, m-, and p-diallyl phthalate.
(g) The polyene was a mixture of o- and m-diallyl phthalate.
(h) The polyene was a mixture of o- and p-diallyl phthalate.
(i) The polyene was a mixture of m- and p-diallyl phthalate.

Further runs (each preparing the photocurable polishing wax of my invention) were made using the general procedure of Example 3. However, in these runs said procedure was modified by replacing the polyene and polythiol of Example 3 with a polyene and a polythiol selected from the above table. At least one run was made wherein each polyene in said table was matched with each polythiol in said table—except that no run was made wherein a diene was matched with a dithiol. In each run the product was a photocurable polishing wax excellently adapted for polishing automobile bodies and other painted metal and wooden surfaces.

As used herein the term "polyene" refers to single or complex species of alkenes, solid or liquid at or below 70°C, having a multiplicity of terminal reactive carbon-to-carbon unsaturated functional groups per average molecule. For example, a diene is a polyene that has two reactive carbon-to-carbon double bonds per averge molecule.

The term "functionality" as used herein refers to the average number of ene or thiol groups per molecule in the polyene or polythiol, respectively. For example, a triene is a polyene with of three "reactive" carbon-to-carbon unsaturated groups per molecule and thus has a functionality of three. A dithiol is a polythiol with two thiol groups per molecule and thus has a functionality of two. A trithiol has a functionality of three, and a tetrathiol has a functionality of four. A diene has a functionality of two, and a tetraene a functionality of four.

As used herein the term "reactive" as applied to the polyfunctional compound or component (the polyene) containing at least two ethylenically unsaturated carbon-to-carbon bonds per molecule means that the unsaturated carbon-to-carbon bonds will react under the conditions as set forth with thiol groups to yield the thioether linkage

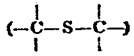

as contrasted to the term unreactive carbon-to-carbon unsaturation which means

groups found in aromatic nuclei (cyclic structures exemplified by benzene, pyridine, anthracene, and the like) which do not under the same conditions react with thiol groups to yield the thioether linkage.

The term "equivalent" as applied to a polythiol means that quantity of the polythiol which contains 33.07 grams of -SH group. Thus, an equivalent of pentaerythritol tetra-beta-mercaptopropionate is one-quarter mole of said mercaptopropionate because each molecule of said mercaptopropionate contains 4 —SH groups (i.e., a mole of this compound contains 132.28 grams of -SH).

In a polythiol compound having the formula

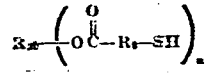

in which $R_{10}$ and $R_4$ are hydrocarbyl moieties (or radicals) an equivalent is one-half mole where $n$ is 2; one-third mole where $n$ is 3, one-quarter mole where $n$ is 4, and one-fifth mole where $n$ is 5.

As noted supra, the term "reactive ethylenically unsaturated group" means a group (having olefinic carbon-to-carbon unsaturation) which will react under proper conditions as set forth herein with thiol groups to yield a thioether linkage

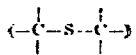

as contrasted to the term "unreactive carbon-to-carbon unsaturation" which means

groups found in aromatic nucleii (cyclic structures exemplified by benzene, pyridine, anthracene, and the like) which do not under the same conditions react with thiols to give thioether linkages.

The term "equivalent" as applied to a compound having reactive olefinic unsaturation means that quantity of the compound which contains one reactive olefinic double bond. Thus, if a compound contains two such bonds an equivalent of said compound is one-half mole of said compound, while an equivalent of a compound containing 3 such bonds is one-third mole, and an equivalent of a compound containing 4 such bonds is one-quarter mole.

As used herein, the term "percent" means parts per hundred and the term "parts" means parts by weight unless otherwise defined where used.

As used herein, the term "mole" has its generally accepted meaning, that is, a mole of a substance is that quantity of the substance which contains the same number of molecules of the substance as there are atoms of carbon in 12 grams of pure $^{12}C$.

As used herein, the term g means gram or grams.

As used herein, the term A means Angstrom units.

As used herein, the term "mesh," as applied to screen size, means U.S. standard.

As used herein, the term ml means milliliter or milliliters.

As used herein, the term "mil" means 0.001 inch; thus, 10 mils is 0.01 inch and 100 mils is 0.1 inch.

I claim:

1. A photocurable polishing wax consisting essentially of a mixture of:
   a. 1 part of a polyene having the formula:

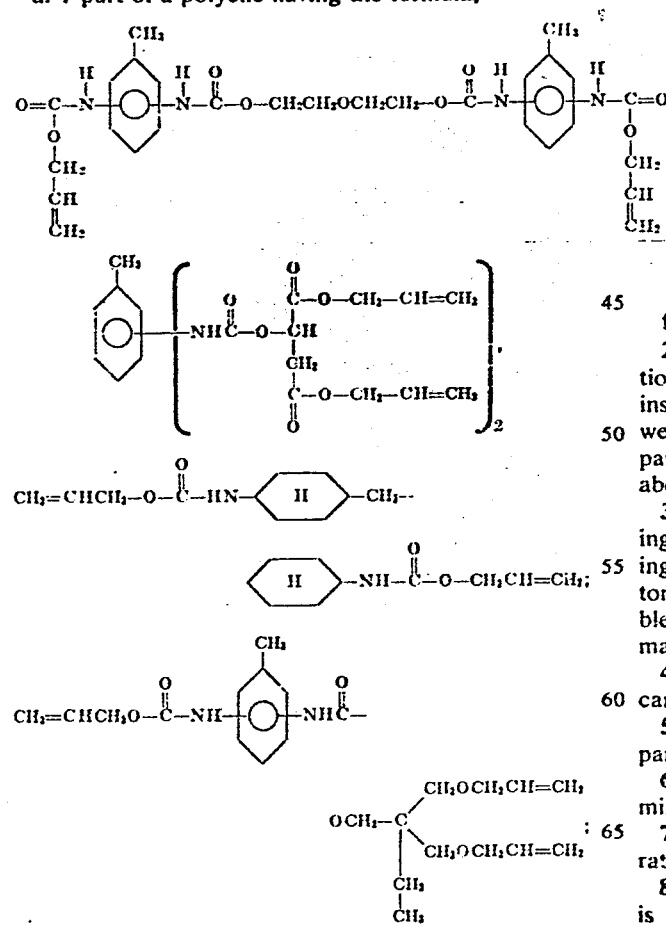

or

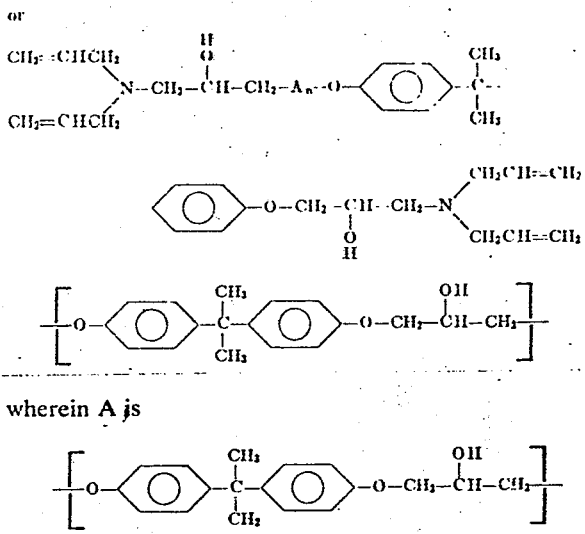

wherein A is and n has an average value such that the average molecular weight of the polyene is about 584;
   b. about 0.2–1 part of a nonionic emulsifier;
   c. about 0.1–2 parts of a wax selected from the group consisting of carnauba wax, a paraffin wax melting at about 43°–68°C, or a mixture thereof;
   d. about 1–50 parts of water;
   e. a quantity of a polythiol having molecules containing at least two thiol groups per molecule to provide about 0.6–1.1 equivalent of polythiol per equivalent of the polyene, the total functionality of the polyene and the polythiol being greater than 4; and
   f. 0.05–0.25 part of a photocuring rate accelerator.

2. The composition of claim 1 in which said composition contains about 5–25 percent by weight of a water insoluble, abrasive, particulate filler based on the weight of the photocurable polishing wax plus filler, the particulate filler being of such size that it will pass about a 100 mesh screen.

3. The composition of claim 1 in which the photocuring rate accelerator is selected from the group consisting of an aryl aldehyde, a diaryl ketone, a dialkyl ketone, an alkyl aryl ketone, a triaryl phosphine, and a blend of a carbon tetrahalide with a polynuclear aromatic hydrocarbon.

4. The composition of claim 1 in which the wax is carnauba wax.

5. The composition of claim 1 in which the wax is paraffin wax.

6. The composition of claim 1 in which the wax is a mixture of carnauba wax and paraffin wax.

7. The composition of claim 1 in which photocuring rate accelerator is benzophenone.

8. The composition of claim 1 in which the polyene is

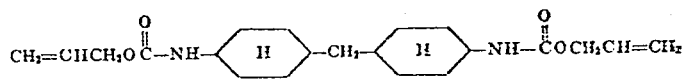

9. The composition of claim 1 in which polythiol is pentaerythritol tetrakis (β-mercaptopropionate).

10. The composition of claim 1 in which nonionic emulsifier is a polyoxypropylene-polyoxyethylene.

11. The composition of claim 1 in which the polyene is

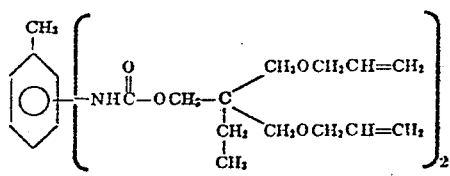

12. The composition of claim 1 in which there is about 0.05–0.1 part of photocuring rate accelerator per part of the polyene.

13. The composition of claim 1 in which water content of the photocurable polishing wax is about 2–10 parts per part of the polyene.

14. A photocurable polishing wax consisting essentially:
a. 1 part of a polyene having the formula

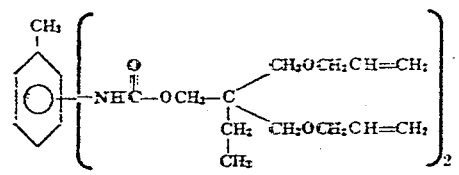

b. 1 part of a nonionic emulsifier prepared by the reaction of ethylene oxide with a polypropylene glycol,
c. 0.5 part of carnauba wax;
d. 0.3 part of beeswax:
e. 0.5 part of a silicone oil having a viscosity of 90–200 centipoises at 25°C;
f. 3.5–4 parts of water;
g. 0.6 part of pentaerythritol tetrakis (β-mercaptopropionate); and
(h) 0.08–0.12 part of benzophenone.

* * * * *

PO-1050
(5/69)

UNITED STATES PATENT OFFICE
CERTIFICATE OF CORRECTION

Patent No. 3,853,728          Dated December 10, 1974

Inventor(s) Joseph Francis Wrzesinski

It is certified that error appears in the above-identified patent and that said Letters Patent are hereby corrected as shown below:

Change the formula in line 55 of column 21 from

" 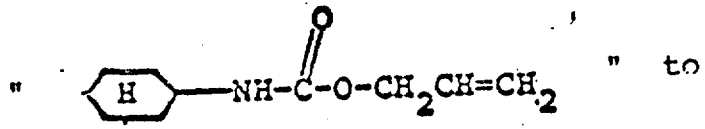 " to

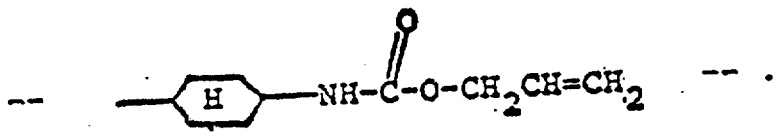 -- .

Change the formula in line 65 of column 21 from

" 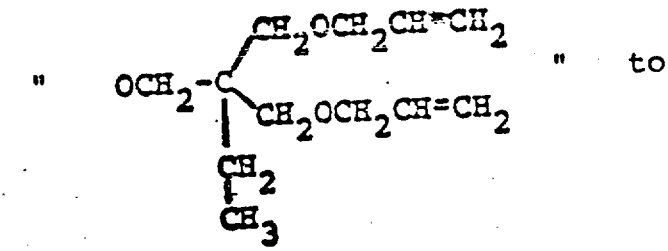 " to

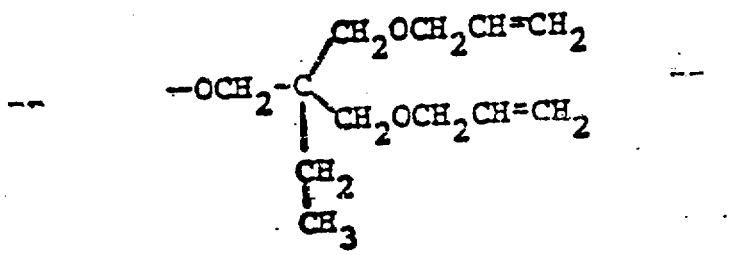 -- .

- 1 -

UNITED STATES PATENT OFFICE
CERTIFICATE OF CORRECTION

Page - 2 -

PO-1050 (5/69)

Patent No. 3,853,728     Dated December 10, 1974

Inventor(s) Joseph Francis Wrzesinski

It is certified that error appears in the above-identified patent and that said Letters Patent are hereby corrected as shown below:

Change the formula in line 6 of column 22 from

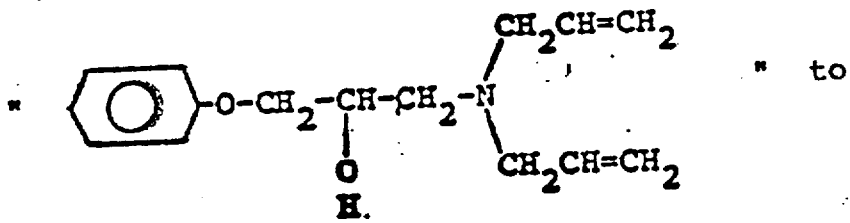 " to

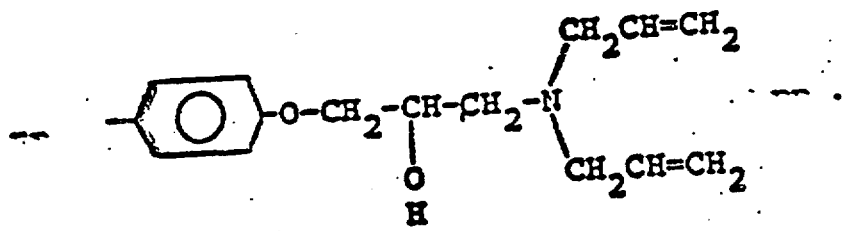 --.

Delete the formula in line 11 of column 22.

Change the formula in line 16 of column 22 from

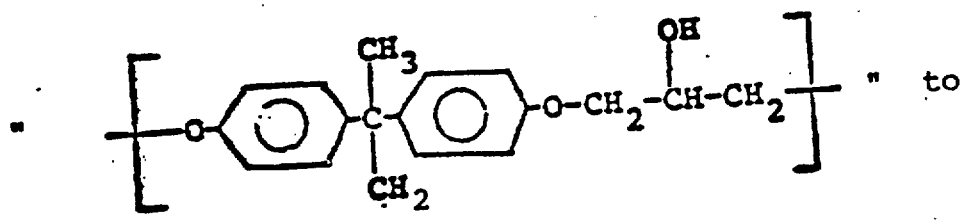 " to

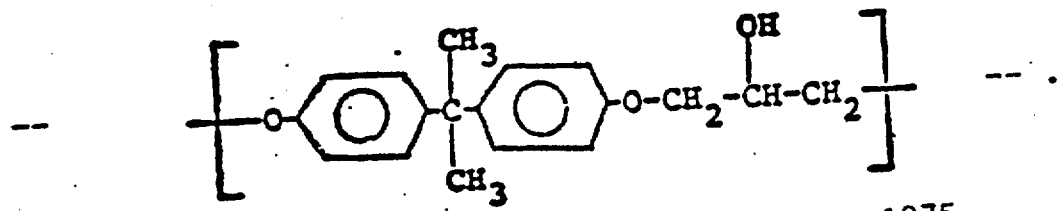 --.

Signed and sealed this 6th day of May 1975.

(SEAL)
Attest:

RUTH C. MASON
Attesting Officer

C. MARSHALL DANN
Commissioner of Patents
and Trademarks